(12) United States Patent
Ohshita

(10) Patent No.: US 6,411,058 B1
(45) Date of Patent: Jun. 25, 2002

(54) RESOLVER

(75) Inventor: Hiromi Ohshita, Nagano-ken (JP)

(73) Assignee: Tamagawa Seiki Kabushiki Kaisha, Nagano-Ken (JP)

( * ) Notice: Subject to any disclaimer, the term of this patent is extended or adjusted under 35 U.S.C. 154(b) by 334 days.

(21) Appl. No.: 09/052,162

(22) Filed: Mar. 31, 1998

(51) Int. Cl.$^7$ .................................................. G05B 1/06
(52) U.S. Cl. ........................................ 318/661; 318/605
(58) Field of Search .................................. 318/661, 605

(56) References Cited

U.S. PATENT DOCUMENTS

| | | | | |
|---|---|---|---|---|
| 4,733,117 A | * | 3/1988 | Perrins | 310/162 |
| 4,755,751 A | * | 7/1988 | Ray | 324/207.18 |
| 4,772,815 A | * | 9/1988 | Harned et al. | 310/171 |
| 4,980,594 A | * | 12/1990 | Poro | 310/168 |
| 5,349,257 A | * | 9/1994 | Hernden | 310/68 B |
| 5,708,344 A | * | 1/1998 | Hayashi et al. | 318/605 |
| 5,763,976 A | * | 6/1998 | Huard | 310/168 |
| 5,767,607 A | * | 6/1998 | Kieffer | 310/261 |

* cited by examiner

Primary Examiner—Robert E. Nappi
Assistant Examiner—Rina I. Duda
(74) Attorney, Agent, or Firm—Sughrue Mion, PLLC

(57) ABSTRACT

An improved resolver permits the outer periphery of a ring-shaped stator and the inner periphery of a ring-shaped rotor to be directly exposed by eliminating the use of a case and a hollow rotating shaft to thereby reduce the outside diameter of the resolver as a whole. This arrangement overcomes the difficulty of reducing the outside diameter of a prior art resolver due to a case disposed to the outer periphery of a ring-shaped stator and a hollow rotating shaft disposed to the inner periphery of a ring-shaped rotor.

2 Claims, 2 Drawing Sheets

RESOLVER

BACKGROUND OF THE INVENTION

1. Field of the Invention

The present invention relates to a resolver, and more specifically, to the novel improvement of a resolver for simplifying the structure thereof by eliminating a case used as a ring-shaped stator and a hollow rotating shaft used as the ring-shaped rotor as well as saving a space necessary to incorporate the resolver in a motor case.

2. Description of the Related Art

This type of prior art variable reactance resolvers are arranged as shown, for example, in FIG. 1. That is, what is denoted by numeral 1 in FIG. 1 is a ring-shaped stator having a stator winding 2 to which a lead wire 2A is connected and the outer periphery of the ring-shaped stator 1 is held by a ring-shaped case 3. A ring-shaped rotor 5 held by a hollow shaft 4 is rotatably disposed inwardly of the ring-shaped stator 1.

Since the prior art resolvers are arranged as described above, they have the following problems. That is, since the case is disposed around the outside of the ring-shaped stator, when the case is accommodated in a motor case, it is difficult to assemble the resolver inside a small motor because the outside diameter of the motor case increases as well as since the resolver uses a large number of parts, and cost reduction thereof is difficult.

Further, since the hollow shaft is disposed inwardly of the ring-shaped rotor, the outside diameter of the resolver is increased by the wall thickness of the hollow shaft and cost reduction is made difficult by the number of parts used.

An object of the present invention is to provide a resolver whose structure is simplified by eliminating a case used as a ring-shaped stator and a hollow rotating shaft used as a ring-shaped rotor as well as saving the space necessary to incorporate the resolver in a motor case.

SUMMARY OF THE INVENTION

A resolver according to the present invention comprises a ring-shaped rotor that is composed of a magnetic material, does not include a winding and is rotatably disposed inwardly of a ring-shaped stator having a stator winding, wherein the outer periphery of the ring-shaped stator is directly exposed and as the inner periphery of the ring-shaped rotor is directly exposed.

More specifically, the outer periphery of the ring-shaped stator is in direct contact with the inner periphery of a motor case and the inner periphery of the ring-shaped rotor is in direct contact with the outer periphery of the motor rotating shaft in the motor case.

DESCRIPTION OF THE PREFERRED EMBODIMENT

A preferable embodiment of a resolver according to the present invention will be described below in detail with reference to the accompanying drawings. In the following description, parts similar or equivalent to those of prior art are described using the same reference designators as those used in describing the prior art.

Figure 1:
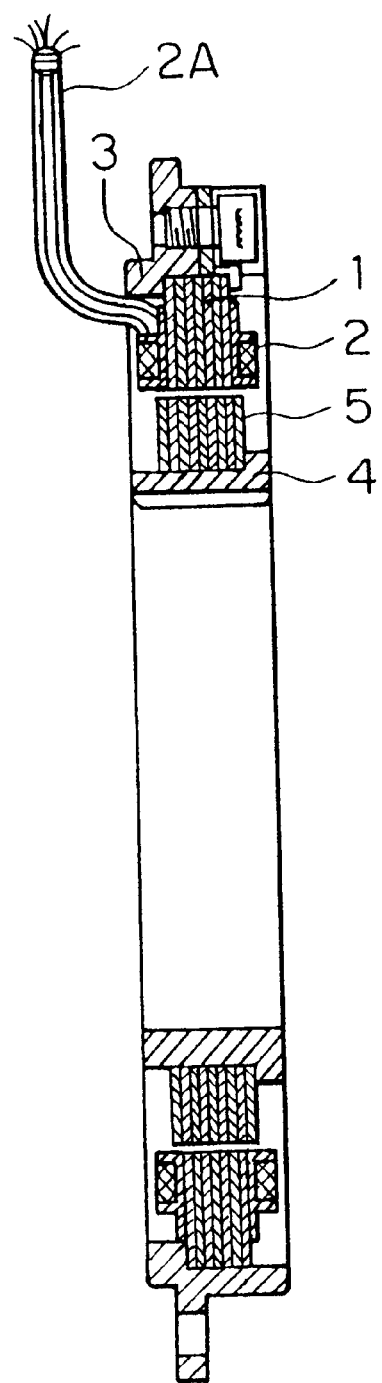
FIG. 1 is a sectional view showing a prior art resolver.
Figure 2:
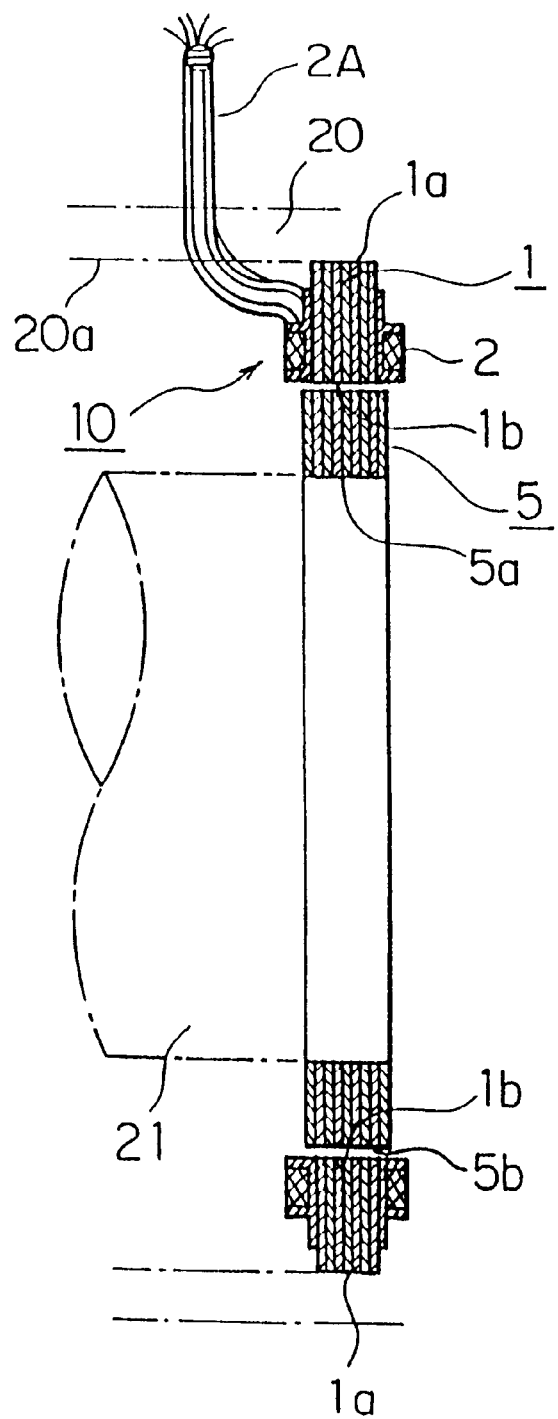
FIG. 2 is a sectional view showing a resolver according to the present invention.

What is denoted by numeral 1 in FIG. 2 is a ring-shaped stator having a stator winding 2 to which a lead wire 2A is connected. Since a case and the like are not disposed to the outer periphery 1a of the ring-shaped stator 1, the outer periphery 1a is directly exposed to the outside. As is known well, the stator winding 2 is provided with an exciting side and an output side, and a ring-shaped rotor 5 composed of a magnetic material is rotatably disposed inwardly of the ring-shaped stator 1. Since no hollow shaft is disposed to the inner periphery 5a of the ring-shaped rotor 5, the inner periphery 5a is directly exposed to the outside. Although not shown in the drawing, the ring-shaped rotor 5 is composed of a laminated magnetic material or a solid magnetic material as a whole. Since the interval between the outer periphery 5b of ring-shaped rotor 5 and the inner periphery 1b of the ring-shaped stator 1 variously changes, the resolver is arranged as a so-called reactance type resolver.

When the resolver 10 is incorporated in a motor case 20, the outer periphery 1a of the ring-shaped stator 1 is directly abutted against the inner wall 20a of the motor case 20 and the inner periphery 5a of the ring-shaped rotor 5 is in direct contact with a motor rotating shaft 21. The stator winding 2 is composed of an exciting winding and an output winding which are not shown. The change of an output voltage in accordance with a rotation angle is detected by the change of reactance caused by the change of the interval between the outer periphery 5b of the ring-shaped rotor 5 and the inner periphery 1b of the ring-shaped stator 1 which results from the rotation of the ring-shaped rotor 5, whereby the well-known variable reactance type resolver is arranged.

Since the resolver of the present invention is arranged as described above, the following advantages can be obtained.

That is, since the case and the hollow rotating shaft which are used in prior art are not needed, the number of parts is reduced and a cost can be greatly reduced.

Further, since the case and the hollow rotating shaft are not used, the outside diameter of the resolver can be reduced.

What is claimed is:

1. A resolver, comprising:
    a ring-shaped rotor that is composed of a magnetic material, does not include a winding, and is rotatably disposed inwardly of a ring-shaped stator having a stator winding, wherein the outer periphery of the ring-shaped stator is directly exposed and the inner periphery of the ring-shaped rotor is directly exposed.

2. A resolver as claimed in claim 1, wherein the outer periphery of the ring-shaped stator is in direct contact with the inner periphery of a motor case and the inner periphery of the ring-shaped rotor is in direct contact with the outer periphery of the motor rotating shaft in the motor case.

* * * * *